Sept. 28, 1943.  H. H. BLAU  2,330,194

REFLECTING OPTICAL SYSTEM

Filed June 10, 1941

Inventor
HENRY H. BLAU
By
F. H. Knight
Attorney

Patented Sept. 28, 1943

2,330,194

UNITED STATES PATENT OFFICE 2,330,194

REFLECTING OPTICAL SYSTEM

Henry H. Blau, Elmira, N. Y., assignor to Corning Glass Works, Corning N. Y., a corporation of New York Application June 10, 1941, Serial No. 397,498

6 Claims. (Cl. 88—82)

The present invention is directed to reflecting signals and particularly to a form of signal which is ideal for use in reflecting back to an observer, stationed adjacent the line of a light source falling on the signal, the appearance of illumination of the signal. Signals of this form are particularly useful when placed alongside an automobile traffic lane at spaced intervals to signal to a driver the path ahead. Signals have heretofore been proposed for such use, but so far as applicant is aware, the extent of their use has been rather limited because of their excessive cost.

The prime object of the present invention is a signal of the foregoing character which can be manufactured more economically than those of heretofore known types.

Another object of the invention is a signal capable of reflecting light intercepted from sources oppositely disposed from the signal.

A further object is a signal which when placed alongside of a traffic lane can serve to inform traffic of the direction from which the signal is being approached and characteristics of the lane ahead.

Another object is a signal which intercepts and reflects light falling upon it from either of two opposite directions and reflects back a signal characteristic of the source of the reflected light.

The invention is characterized by the use of two groups of lenses with those of one group oppositely disposed in respect to those of the other at a distance apart less than their focal length with the posterior surfaces of the respective lenses of each group planar and with the planar surfaces of certain lenses of one group silvered or otherwise rendered reflective and with the planar surfaces of those lenses of the other group arranged opposite the clear lenses of the first group also rendered reflective.

The two groups may be assembled in a unitary structure by forming lenticular bosses, constituting lenses on one face of a disc of glass and assembling two such discs reversely in a suitable manner with the bossed faces opposite each other and then silvering or otherwise rendering reflective selected portions of the outer faces of such discs. A construction as above outlined is capable of reflecting light in opposite directions and may be arranged to appear distinctly different when approached from one direction than when approached from the opposite direction. Therefore, signals of this character are ideally suited for use alongside an automobile traffic lane because they can serve, when approached from one direction, to mark in one manner the left limits of the traffic lane while also serving to mark in another manner the right limits of the traffic lane to traffic approaching from the opposite direction. They may also be variably mounted to indicate the general course of the highway beyond. The construction as above outlined is moreover economical to manufacture in that it permits the construction of a two-way signal of relatively large area from two pressed discs of glass which may be identical in contour.

In the accompanying drawing

Figure 1:
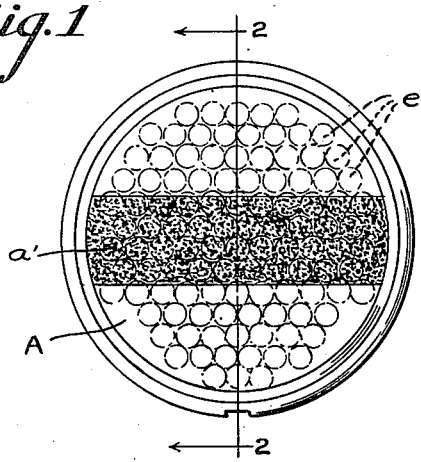
Fig. 1 is a front elevation of one form of assembly embodying the invention.
Figure 2:
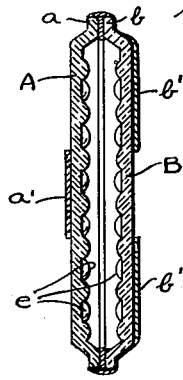
Fig. 2 is a sectional view taken on line 2—2 of Fig. 1.
Figure 3:
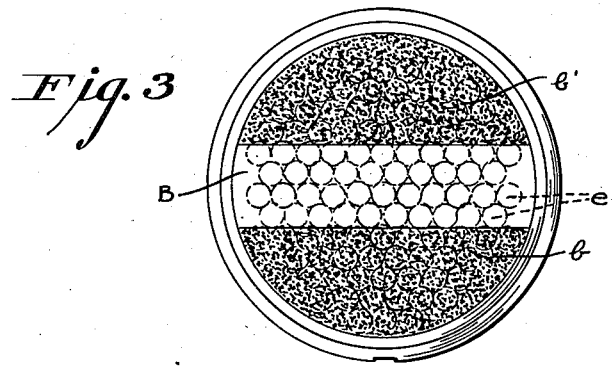
Fig. 3 is a rear elevation of the assembly.

As shown in Fig. 2, the complete unit consists of discs of glass A and B, each having a flange $a$ or $b$ surrounding it, offset from its plane. These flanges are coated with metal enabling two of the discs to be sealed together at their flange portions by soldering when arranged with the lenses $e$ of the discs facing each other, as illustrated in Fig. 2. As will be readily understood, the proper spacing of the lenses is taken care of by the amount of offset of flanges $a$ and $b$. Each disc A or B serves as a reflector and also as a light transmitter. As depicted, disc A has portion $a'$ of its exterior surface coated leaving the remainder of such surface clear for transmitting light reflected by coated surfaces $b'$ of disc B. As will be readily understood, the uncoated exterior surface portion of disc B serves to transmit light reflected by the oppositely disposed coated surface $a'$ of disc A.

Each pair of aligned bosses with a mirror backing, provided by suitably coating the planar surface opposite one of the bosses, constitutes a complete optical system which is composed of two plano convex lenses $e$ spaced from each other by a distance less than the focal length of the lenses, and a mirror surface, the latter being part of one or the other of the planar faces of the assembly, situated at approximately the principal focal point of the doublet formed by an aligned pair of lenticular bosses. Under such conditions any ray M incident on the anterior face of a transparent portion of either disc is parallel with the principal axis of the system and adjacent to such axis is refracted by the curved surface of the boss towards the principal axis, and enters the other disc without being refracted by the curved surface of the oppositely disposed boss carried thereby. Since the ray is bent toward the axis by the curved surface of the boss $e$ on the first disc and is not refracted upon entering the other disc, it becomes evident that it will cross the axis at some point in the rear of the first disc.

Figure 4:
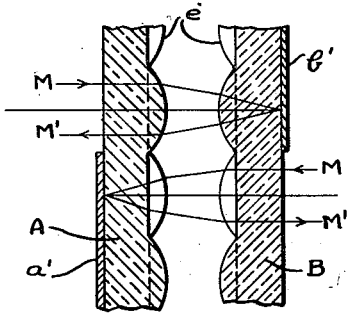
Fig. 4 is a diagram illustrating the paths of rays through lenses of an assembly as shown in Figs. 1, 2 and 3 when the incident rays are parallel with the principal axes of the lenses.

By proper variation of the amount of offset of flanges $a$ and $b$, the reflecting surfaces may be caused to intersect the axis at a point where the ray M crosses it and hence such ray will be reflected back through the first disc on the side of the axis opposite that which is entered and will emerge from the system as ray M', substantially parallel with the axis as shown in Fig. 4.

Figure 5:
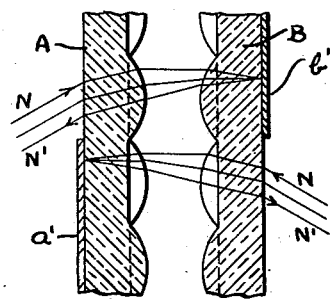
Fig. 5 is a similar view to Fig. 4 but showing the course of rays oblique to the principal axes of the lenses.

As illustrated in Fig. 5, a ray N from an oblique incident bundle of light will strike the plane outer surface of the disc which it enters and be again refracted as it leaves the disc. Passing on toward the other disc the ray N is again refracted by the front curved surface of the boss thereof and entering the disc is bent toward the reflecting surface thereof from whence it is returned through the first disc and is again refracted by the curved surface of its boss and its flat face so that it finally emerges as ray N', substantially parallel with the axis of the oblique bundle.

In the foregoing embodiment of the invention less than 40% of one surface of the signal is provided with a reflective coating in the form of a panel or band extending through its center with more than 30% of its opposite surface on either side of the band similarly coated for reflection of light in the opposite direction. The absence of light reflection from the center of the signal by such a band is not apparent when the signal first becomes visible and, since the combined areas utilized in reflecting light in the opposite direction are of greater surface area than that occupied by the band, the signal reflected in the opposite direction is distinctively of the greater intensity. The signal surface having the greater intensity can conveniently be employed to mark the highway bounding adjacent oncoming traffic while units on the opposite side of the highway can be arranged to reflect the narrow and less intense light beam to mark the opposite boundary of the highway to such oncoming traffic. The distinction in appearance of the beams of light reflected by the two sides of a signal can be further amplified, if desired, by coating the inner surface of the lens of one group of the optical systems with a transparent layer of colored lacquer or the like so that the light reflected by the signals approached from one direction will be of a distinctive color characteristic. Also, by arranging units along both boundaries of a highway, as above outlined, the signals may conveniently be turned in their supporting frames varying distances so as to indicate any deviation either to the right or left from a staight course ahead and in general the amount of deviation. As will be obvious, as a substitution for the straight band reflecting area, such band may be curved or be the outline of a letter, number, or other symbol. Also, the proportion of light reflection of the respective faces of the signal can be modified to meet variations in its requirements without departing from the spirit and scope of the invention as claimed.

What is claimed is:

1. In a reflecting structure, the combination with two discs of transparent material, said discs being spaced apart from each other, each disc having on its inner face a series of bosses forming converging lenses, the lenses on the one disc being opposite the lenses on the other disc, the outer faces of the discs intersecting the principal axes of the systems formed by the several pairs of lenses at approximately the principal focal points of such systems and each disc being provided with a reflective coating on that portion of its outer face opposite an uncoated portion of the outer face of the other.

2. In a reflecting structure, the combination with two discs of transparent material, said discs being spaced apart from each other, each disc having on its inner face a series of bosses forming converging lenses, the lenses on the one disc being opposite the lenses on the other disc, the outer faces of the discs intersecting the principal axes of the systems formed by the several pairs of lenses at approximately the principal focal points of such systems and each disc being silvered on that portion of its outer face opposite an unsilvered portion of the outer face of the other.

3. In a reflecting structure a pair of transparent plates, means to retain the plates in spaced parallel relation, lenticular bosses on the adjacent faces of said plates, the axes of the bosses on one plate aligning with those of the bosses on the other plate and a reflecting coating on a selected outer surface area of each plate opposite a portion of the other plate which has been left transparent.

4. A hollow article of transparent material having two bosses forming converging lenses on an inner surface thereof and a reflective coating on the exterior surface portion thereof opposite that occupied by one of said bosses, a third similar boss on an oppositely disposed inner surface of the article in axial alignment with the boss opposite the coated surface, a fourth similar boss on the oppositely disposed inner surface of the article in axial alignment with the other of said first bosses, and a reflective coating on the exterior surface portion of the article opposite that occupied by the fourth boss.

5. In a reflecting structure, the combination with two discs of transparent material, said discs being spaced apart from each other, each disc having on its inner face a series of bosses forming converging lenses, the lenses on the one disc being opposite the lenses on the other disc, the outer faces of the discs intersecting the principal axes of the systems formed by the several pairs of lenses at approximately the principal focal points of such systems, said discs being each provided with a reflective coating on one portion of its outer face opposite an uncoated portion of the outer face of the other and one of said discs having a greater coated surface area than the other.

6. In a reflecting system two discs of transparent material each having a pair of lens areas formed on one surface thereof, each disc having the surface area opposite one of its lens areas coated with a reflecting material and the discs being so arranged with respect to each other that the lens of each disc whose opposite surface is coated faces an uncoated lens of the other disc.

HENRY H. BLAU.